United States Patent [19]

Hopper et al.

[11] 4,298,207

[45] Nov. 3, 1981

[54] RESILIENT GASKET MATERIAL

[75] Inventors: Chester S. Hopper, Newtown; Edward M. Case, Weston, both of Conn.

[73] Assignee: The Marlo Company, Inc., Newtown, Conn.

[21] Appl. No.: 182,528

[22] Filed: Aug. 29, 1980

[51] Int. Cl.³ .............................................. F16J 15/22
[52] U.S. Cl. ............................ 277/230; 277/DIG. 6; 428/247; 428/268
[58] Field of Search ................ 277/DIG. 6, 227, 228, 277/229, 230; 156/148, 149; 428/365, 245–247, 268

[56] References Cited

U.S. PATENT DOCUMENTS 2,895,759  7/1959  Conrad et al. ................. 277/229 X
3,534,652 10/1970  Zumeta et al. ................. 277/230 X
3,791,658  2/1974  Zumeta et al. ................. 277/230

FOREIGN PATENT DOCUMENTS 840873  5/1970  Canada ............................. 277/227
  6877  of 1908 United Kingdom ............... 277/229
502643  3/1939  United Kingdom ............... 277/230

Primary Examiner—Robert S. Ward, Jr.
Attorney, Agent, or Firm—Blum, Kaplan, Friedman, Silberman & Beran

[57] ABSTRACT

A gasket material has a resilient core of glass fiber and a jacket of glass or other suitable fiber over said core. The jacket and core may have therebetween an essentially impermeable sheath of a chemically resistant material. The jacket has therein enough polytetrafluoroethylene in dispersed form to prevent flow of liquid therethrough. The core may have enough of the polytetrafluoroethylene dispersion therein to prevent wicking.

21 Claims, 5 Drawing Figures

RESILIENT GASKET MATERIAL

BACKGROUND OF THE INVENTION

The rapid growth of international trade in chemicals in recent years has let to the development of specialized cargo vessels—chemical tankers—for the expeditious and economical transport of liquid chemicals by water. Such vessels carry their cargo in tanks forming integral parts of the ship corresponding to the holds of conventional vessels. Typically, a chemical tanker will have a plurality of tanks, the contents of which may differ. A given tank may contain a different chemical on each voyage.

Typically, the chemical tanks open to a deck for loading and unloading through a hatch. The cover of this hatch must secure the tank—both against spillage of the contents and contamination by water and other materials from without. Essential to the sealing effectiveness of the hatch cover is a gasket, normally held in a groove in apposition to the lip or outer circumference of the hatch cover. This gasket must keep the hatch cover "tight." Similar conditions occur on tank trucks and railway tank cars, and the present invention is suitable to such applications as well.

The desired characteristics of such a gasket are: a. Resistance to the widest variety of chemicals, since the gasket must encounter in random sequence a large number of possible chemicals. b. Durability. The gasket must be sturdy enough to maintain an unbroken seal while withstanding repeated closings of the heavy hatch cover. c. Resilience. The gasket must be sufficiently flexible to seat well in a channel. To retain its sealing effectiveness, the gasket should also be able to recover from impact so that by regaining its shape, it will not be permanently compressed or "set" and thus will seal through repeated closings.

Hatch cover gaskets currently available are lacking in one or more of the desired characteristics described above. Polytetrafluoroethylene (TFE) fiber packings, for instance, will withstand virtually all chemical attack, but they are not sufficiently resilient for this application, and they are also subject to cold flow, which would tend to extrude them from the channel in which they are seated. TFE-impregnated asbestos packings have lower chemical resistance than TFE fiber and are less durable. Also, they have no resilience. Additionally, in view of the well-known carcinogenic properties of asbestos, many operators would prefer to have an asbestos-free product which could not conceivably contaminate the contents of the tank or create any other undesirable environmental effect. Rubber packings are resilient and durable, but they will not withstand many of the solvents used to wash out tanks, nor will they withstand certain frequently transported chemicals.

It would be costly and impractical for the ship owner to inventory a multiplicity of gasketings for use on specific cargos, and costly and impractical for the crew to have to change each gasket on a number of tanks to other types of gaskets every time the tank is cleaned or a new cargo is loaded.

Accordingly, there is a need for an improved packing for chemical tank lids on ships, trucks and trains, wherein said packing embraces all of the desirable characteristics described above, and it is the purpose of the present invention to provide such an imperatively needed product.

This invention discloses a gasket or packing material which will resist virtually every chemical carried in the typical steel chemical tank, which is strong enough to withstand repeated closures of the hatch or tank cover, and which has the ability to recover from the deformation of the hatch cover after the lid is raised.

SUMMARY OF THE INVENTION

The gasket material of the present invention comprises a core of glass fiber, the glass fiber being so arranged that the core is resilient when compressed in a direction perpendicular to the surfaces thereof. Preferably, the fibers are disposed at an angle to the inner surfaces of an enclosing outer jacket. Where the gasket material is to be formed into a loop with opposing cut ends, the core is lightly impregnated with a TFE dispersion to prevent wicking at this joint. Where the core as well as the jacket thereabout is in the form of a continuous loop, free of opposing cut ends, or where wicking is permissible, impregnation of the core is unnecessary. The weight of TFE dispersion (dry basis) in the core may be from 0 to 25 percent by weight relative to the weight of the glass fiber in the core. Preferably, the weight percentage of the impregnant is 10 to 18 percent.

The core may be in the form of strands of fiberglass twisted together. Resilience may also be achieved with loose fibers bunched together, the fibers being long enough to reach from one surface to an opposing surface of the gasket material or may consist of texturized fiber bundles. The preferred material for both the core and the jacket is chemical-grade glass fiber, and even more preferred is texturized chemical-grade glass fiber.

Between the core and the jacket may be disposed an essentially impermeable sheath of a chemically-resistant, flexible polymer, preferred materials being polytetrafluoroethylene, polymonochlorotrifluoroethylene or polyester.

The jacket is impregnated with from 26 to 45 weight percent of TFE, and preferably from 32 to 38 weight percent of TFE. The sheath may be of thin-walled TFE tubing or finely braided TFE yarn.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWING

For a fuller understanding of the invention, reference is had to the following description taken in connection with the accompanying drawing, in which.

DESCRIPTION OF THE PREFERRED EMBODIMENTS

Figure 1:
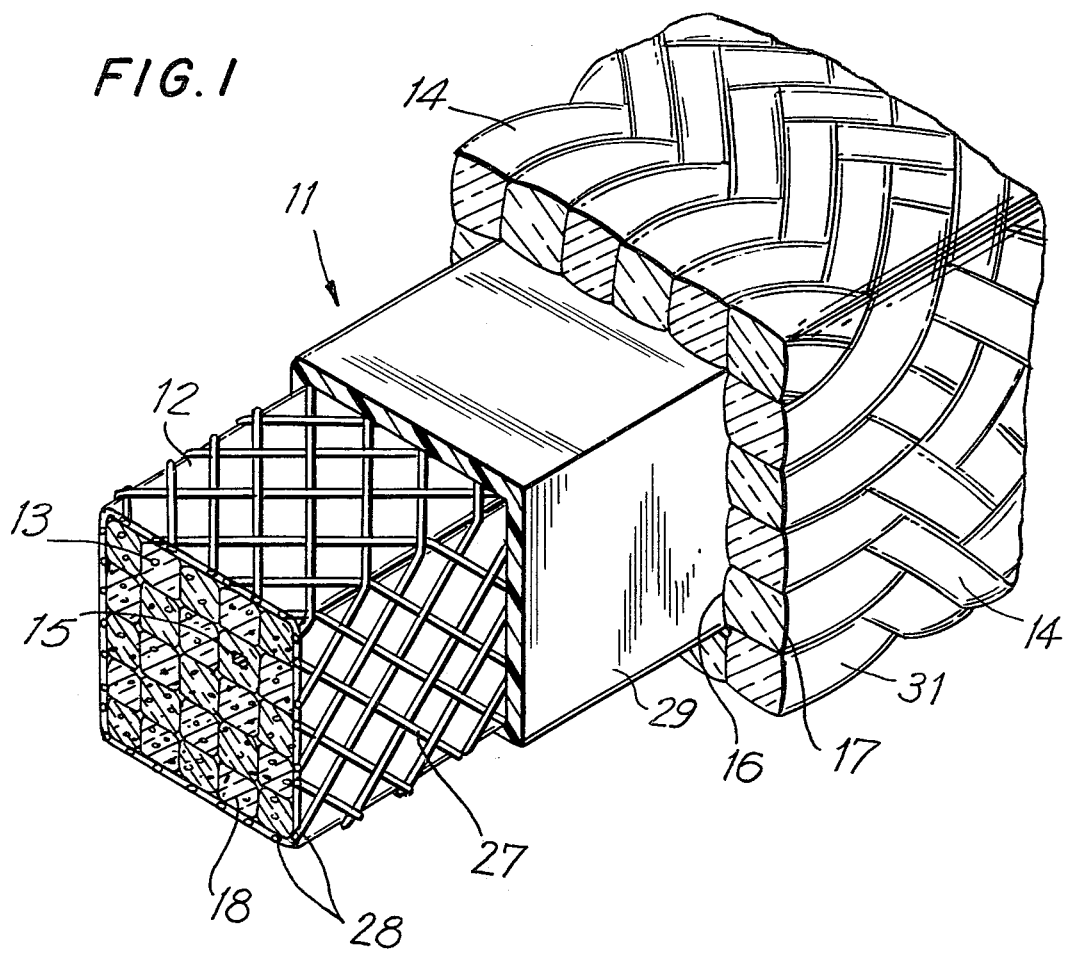
FIG. 1 shows in cut-away form cut ends of a gasket in accordance with the present invention.

Gasket material in accordance with the present invention is indicated generally in FIG. 1 by the reference numeral 11. The material comprises a core 12 of glass fiber strands 13 disposed so that they make an angle with outer surfaces 14 as well as inner surfaces 16 of jacket 17. It is this angular disposition of the glass fibers 13 which provides resilience to the gasket material.

A preferred construction of the central core 12 is one in which a number of strands 13 of fiberglass are twisted together to form bundles. A number of bundles are then twisted together, preferably in the opposite direction, thereby releasing part of the strand twists and loosening the bundle. The relative looseness of the resultant structure, which is not tightly constrained as it would be in a conventional rope twist, allows the core 12 to yield to pressure and, because of the inherent resiliency of fiberglass, allows it to recover its shape after the pressure is released. Recovery is relatively rapid, regardless of the directions of twist, and the number of times that the gasket can be reused is therefore increased.

Figure 4:
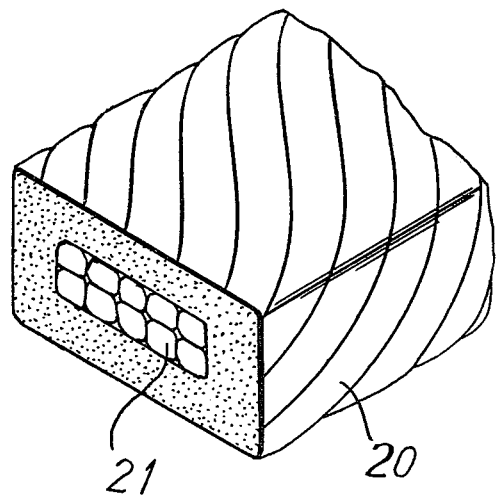
FIG. 4 is a gasket core formed about a central element.

In another core construction as shown in FIG. 4, there is a central braided fiberglass element 21 about which fiberglass element 20 is twisted as shown. The purpose is to bring the twisted element closer to the surface of the gasket without making said element unduly massive in larger sizes of packing.

The core, alternatively, may be a loose filling of fiberglass fibers long enough to reach from the upper inner surface of the surrounding jacket to the bottom inner surface thereof and so disposed that exterior pressure can alter their disposition and orientation. FIG. 1 is to be taken as representing this construction as well as that in which strands are twisted into bundles and the bundles are then twisted together.

Figure 2:
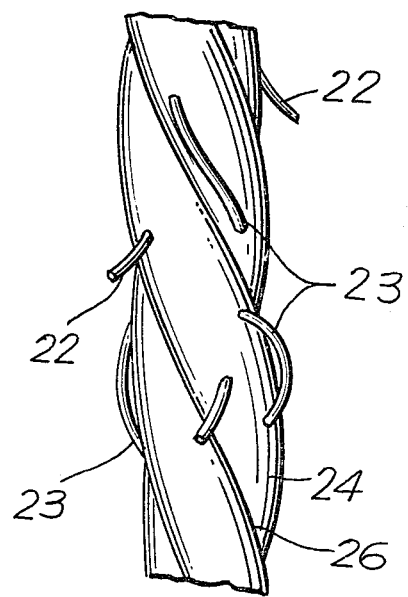
FIG. 2 is a side view of a bundle of texturized glass fibers.
Figure 3:
FIG. 3 is a gasket in accordance with the present invention in the form of a continuous loop.

The preferred material of the core is staple chemical-grade fiberglass. However, texturized fiberglass in chemical or other grades may also be used. Texturized fiberglass, as shown in FIG. 2, consists of glass fibers 26 twisted into strands 24 which have then been subjected to a blowing operation which produces fiber ends 22 and fiber loops 23 which project from the strands. The glass fibers given the reference numeral 26 are to be taken as representing all of the fibers which have not been displaced in the texturizing operation.

Where the gasket material is provided in such form that it must be cut to fit into a channel, for instance, wicking of the fluid to be contained by the gasket material might occur at the cut, such wicking proceeding into the core. In order to prevent such wicking, the core is relatively lightly impregnated with polytetrafluoroethylene (TFE) and dried. The TFE within the core is represented schematically in FIG. 1 at 15. Where the entire gasket material is prepared in the form of a continuous loop 25, as in FIG. 3, impregnation of the core with TFE is not required. Also, where the jacket is to be prepared from yarn pre-impregnated with dispersed TFE, impregnation of the core is unnecessary. The weight of the TFE in the core may then range from 0 percent to 25 percent of that of the core fiberglass and is preferably from 10 to 18 percent by weight.

For purposes of convenient handling of the core during further manipulation, core 12 is preferably covered with an open net or braid, the open net or braid being indicated by the reference numeral 27 and the cut ends of the netting threads being indicated by the reference numeral 28. The net need not be chemically resistant and may, if desired, be of cotton.

An important feature of the gasket material is sheath 29 which may be a continuous tube or a tightly woven braid, the function of this element being to protect the core at a later stage of the manufacture of the gasket material. Sheath 29 may be of TFE, polymonochlorotrifluoroethylene or polyester, commercially available as Mylar. The preferred sheath is of TFE and may be either of a finely braided TFE yarn or a thinwalled TFE tubing. Other chemically resistant yarns may also be used.

As shown in FIG. 1, sheath 29 is covered by jacket 31, which is constructed of braided fiberglass and, preferably, chemical-grade fiberglass. Any braiding configuration, such as interlocked, braid-over-braid, spiral braided or plaited, may be used. Also, the outer cover may be wrapped around the sheath.

After jacket 31 is constructed over the sheath, which in turn is over the core, the entire outer structure is impregnated with a TFE dispersion and dried. The loading of TFE in the jacket can range from 26 to 45 percent by weight relative to the weight of the fibers in the jacket, but is preferably from 32 to 38 percent by weight of same. In general, the core and the jacket are separated from each other by the impermeable sheath, thereby facilitating construction of a gasket material in which the jacket has a higher content of TFE dispersion than does the core. The sheath makes it possible to dip the material into the dispersion and impregnate the jacket to the desired extent without introducing the dispersion into the core in this step. In addition, the sheath facilitates motion of the jacket relative to the core.

In an alternate method of construction the jacket may be prepared from yarn impregnated with dispersed TFE to the desired level. With this method of construction, the step of dipping the gasket material subsequent to forming the jacket over the core may be omitted and the sheath may also be omitted.

Figure 5:
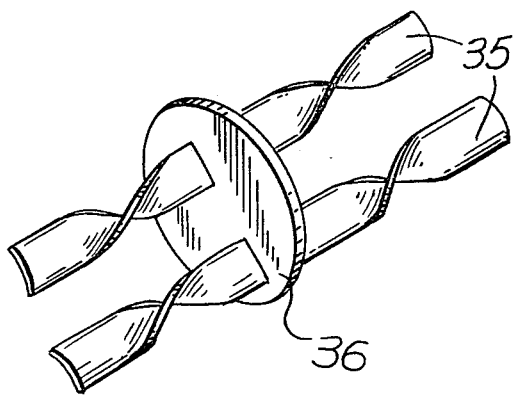
FIG. 5 shows in perspective a gasket core of spiraled glass tape with periodically disposed dams to prevent wicking in said core.

In yet another embodiment, as shown in FIG. 5, the core comprises flat glass tape twisted into spirals 35, and dams 36 of a chemically resistent material such as phenolic or TFE, the dams preventing wicking of chemicals through the core.

As can be seen from the description of the construction of the gasket material, the core with its essentially transverse positioning of the glass fibers therein provides resilience, the TFE dispersion in the core prevents wicking at cut ends, the impermeable sheath protects the integrity of the core during impregnation of the jacket and the jacket contains sufficient TFE therein to prevent access of the fluid against which the gasket material is used from reaching the core. Further, the light webbing of fiber around the core and underneath the sheath facilitates handling of the core during further processing. The entire construction is relatively inexpensive, and consists entirely (except for the webbing around the core) of materials which are resistant to a wide variety of chemicals and over a substantial temperature range. Parenthetically, it is noted that attack of the webbing either by high temperature or chemical is of no importance, since it is needed only during the handling of the core prior to covering same with the sheath and jacket.

As noted above, where the jacket is prepared from yarn pre-impregnated with TFE dispersion, the sheath may be omitted. Calendering of the gasket material densifies the jacket to the point where it suffices to make the gasketing essentially impermeable. In addition, calendering brings the gasket material to the desired cross-section and size. Of course, gasketing material including the sheath may also be calendered to shape and size.

The gasket material described herein is particularly designed for sealing a hatch cover or tank lid. However, it may also be used advantageously as a pump packing or in other dynamic sealing functions. Here the resilient action of the fiberglass core serves to improve not only the sealing effectiveness, in terms of snugness to the rod, shaft or plunger, but also to minimize the problem of packing installation, since only minimum preloading and minimum adjustment are necessary. Additionally, the pressure of the fluid on the packing acts as a positive force enhancing the integrity of the seal.

For certain purposes, it may be desirable to make the exterior cover or jacket out of graphite or carbon filament because of the fact that these particular filaments provide lower friction and improved heat transfer. However, TFE or polymonochlorotrifluoroethylene or aramid yarn or any other material which may be indicated by the specific frictional, chemical and temperature factors involved may used for the outer jacket, keeping constant the fiberglass core, the resilient characteristic of which would help to maintain the efficacy of the jacket and the entire construction.

It will thus been seen that the objects set forth above, among those made apparent from the preceding description, are efficiently attained, and since certain changes may be made in the above product without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A chemically resistant, resilient gasket material, said gasket material having opposed surfaces for forming a seal between a rim and a cover for said rim, said gasket material having a cross-section comprising:
a core of glass fibers disposed at an angle to said surfaces for providing resilience to said material; and
a jacket of a fiber selected from the group consisting of glass fiber, carbon fiber, graphite fiber, polytetrafluoroethylene (TFE) fiber, polymonochlorotrifluoroethylene (PMC) fiber and aramid fiber and dispersed TFE within said jacket in sufficient quantity to prevent the flow of liquid therethrough, said jacket being disposed about said core.

2. The gasket material as defined in claim 1, further comprising an essentially impermeable sheath of a chemically-resistant, flexible polymer between said core and said jacket.

3. The gasket material as defined in claim 2, wherein said sheath is of a material selected from the group consisting of TFE, PMC and aramid.

4. The gasket material as defined in claim 2, wherein said sheath is of TFE.

5. The gasket material as defined in claim 2, wherein said sheath is of a braided fiber.

6. The gasket material as defined in claim 2, wherein said sheath is in the form of a tube.

7. The gasket material as defined in claim 1 or 2, wherein said core is elongated, has cut ends and has therein a quantity of dispersed TFE sufficient to prevent wicking and less than that which would substantially decrease the resilience of said gasket material.

8. The gaskt material as defined in claim 7, wherein said quantity of dispersed TFE in said core is up to about 25 weight percent of the weight of glass fiber in said core.

9. The gasket material as defined in claim 8, wherein said quantity is from about 10 to 18 weight percent of the weight of glass fiber in said core.

10. The gasket material as defined in claim 1 or 2, wherein said core comprises strands of glass fibers twisted into bundles and said bundles are twisted together.

11. The gasket material as defined in claim 10 wherein said strands are texturized.

12. The gasket material as defined in claim 1, wherein said quantity of dispersed TFE in said jacket is from about 26 to 45 weight percent of the weight of fiber in said jacket.

13. The gasket material as defined in claim 1, wherein said quantity of dispersed TFE is from about 32 to 38 weight percent of the weight of fiber in said jacket.

14. The gasket material as defined in claim 1 or 2, wherein said core comprises glass fibers wound in a spiral.

15. The gasket material as defined in claim 14, further comprising a central, braided glass fiber element, said glass fibers of said core being twisted around same.

16. The gasket material as defined in claim 1, wherein said glass fibers of said core are long enough to reach at least from one of said opposing surfaces to the opposite surface of said core and are loosely bunched.

17. The gasket material as defined in claim 1 or 2, wherein said material is essentially rectangular in cross section.

18. The gasket material as defined in claim 1 or 2, wherein said gasket material is in the form of a closed loop whereby it is free of opposing cut ends.

19. The gasket material as defined in claim 1 or 2, wherein said core has contiguously thereover a fiber of low denier disposed for holding said core together during subsequent handling.

20. The gasket material as defined in claim 1, wherein said glass fiber is chemical-grade glass fiber.

21. The gasket material as defined in claim 1 or 2, wherein said glass fibers of said core are in the form of glass tape, said core comprising a plurality of lengthwise-extending spirals of said glass tape and periodically and transversely disposed dams for preventing wicking in said core.

* * * * *